(12) United States Patent
Moquin

(10) Patent No.: US 6,507,650 B1
(45) Date of Patent: Jan. 14, 2003

(54) METHOD FOR NOISE DOSIMETRY IN APPLIANCES EMPLOYING EARPHONES OR HEADSETS

(75) Inventor: Philippe Moquin, Kanata (CA)

(73) Assignee: Mitel Corporation, Kanata (CA)

( * ) Notice: Subject to any disclaimer, the term of this patent is extended or adjusted under 35 U.S.C. 154(b) by 0 days.

(21) Appl. No.: 09/488,151

(22) Filed: Jan. 20, 2000

(30) Foreign Application Priority Data

Apr. 27, 1999 (GB) ............................................ 99097108

(51) Int. Cl.[7] .......................... H04M 9/00; H04R 29/00; G01H 3/14
(52) U.S. Cl. ........................ 379/387.01; 381/56; 73/648
(58) Field of Search ........................ 381/56; 379/428.02, 379/387.01; 73/645, 646, 647, 648

(56) References Cited

U.S. PATENT DOCUMENTS 2,884,085 A * 4/1959 von Wittern et al. ......... 73/647
4,554,639 A * 11/1985 Baker et al. ................... 73/647
5,072,415 A * 12/1991 Cannelli et al. ............... 73/647

FOREIGN PATENT DOCUMENTS

| CA | 1072200 | 2/1980 |
| EP | 0122074 A2 | 10/1984 |
| FR | 2 473174 | 7/1981 |
| GB | 2098733 A | 11/1982 |

* cited by examiner

Primary Examiner—Forester W. Isen
Assistant Examiner—Daniel Swerdlow
(74) Attorney, Agent, or Firm—Beyer Weaver & Thomas, LLP

(57) ABSTRACT

A noise dosimeter for an appliance including a speaker to broadcast signals includes a filter receiving signals to be broadcast and having a transfer function generally modeling the frequency response of the appliance to provide output approximating noise appearing at the speaker. Signal processing circuitry processes the filter output before it is accumulated by an accumulator. The value of the accumulator represents a user's exposure to noise when using the appliance.

19 Claims, 1 Drawing Sheet

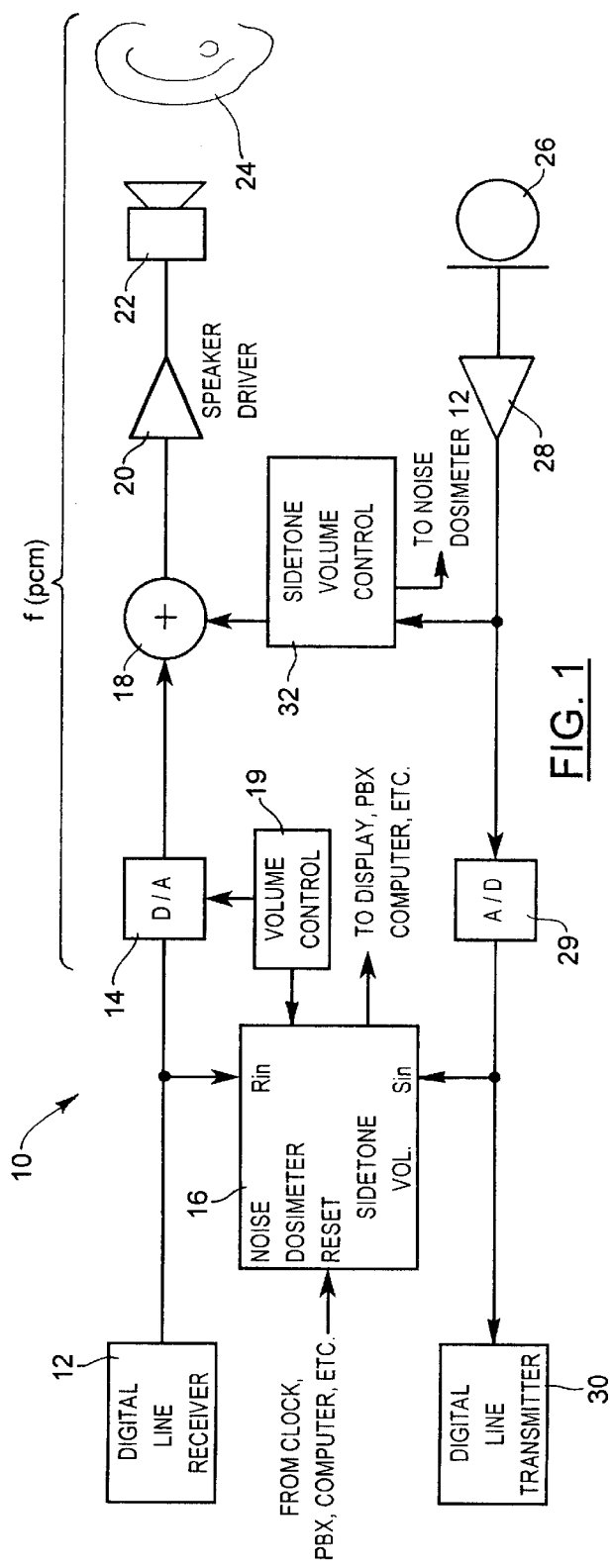
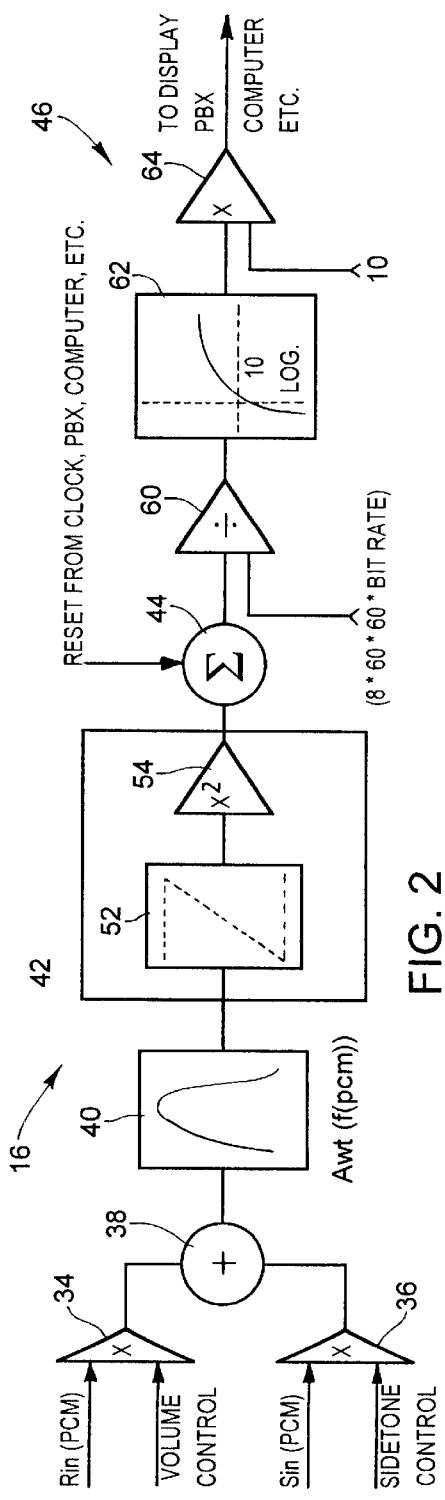

_METHOD FOR NOISE DOSIMETRY IN APPLIANCES EMPLOYING EARPHONES OR HEADSETS_

FIELD OF THE INVENTION

The present invention relates to a method and noise dosimeter for measuring a user's exposure to noise when using appliances employing earphones and headsets.

BACKGROUND OF THE INVENTION

Evidence suggests that individuals spending significant time using appliances with earphones or headsets may be exposed to excessive acoustical noise doses. Unfortunately, monitoring appliances for noise emissions is typically not done and when it is, it is usually done only after a significant number of users suffer hearing loss. The end result can be significant compensation claims.

To-date, two methods have been used to measure a user's exposure to noise when using an appliance, namely a direct method and an indirect method. In the direct method, each subject to be tested for noise exposure is fitted with a probe microphone inserted in the subject's ear canal. As will be appreciated, this method is intrusive and requires the services of a specialist and the use of specialized tools. As a result, only a limited number of subjects can be tested and only for a limited amount of time.

In the indirect method, the earphones or headset of the appliance to be monitored for noise emissions is placed on an artificial head that measures the acoustical pressure applied to its ear. Unfortunately, these artificial heads are expensive. Also, the artificial heads do not take volume level changes, controlled by users, into account. Accordingly, improvements to appliance noise monitoring are desired.

It is therefore an object of the present invention to provide a novel method and noise dosimeter for measuring a user's exposure to noise when using appliances employing earphones or headsets.

SUMMARY OF THE INVENTION

According to one aspect of the present invention there is provided a noise dosimeter for an appliance including a speaker to broadcast signals comprising:

a filter receiving signals to be broadcast by said speaker and having a transfer function generally modeling the frequency response of said appliance to provide output approximating noise appearing at said speaker;

signal processing circuitry to process the output of said filter; and an accumulator to accumulate the output of the signal processing circuitry, the value in said accumulator representing a user's exposure to noise when using said appliance.

Preferably, the noise dosimeter includes sampling period circuitry scaling the output of the accumulator to provide a value representing the user's exposure to noise over a specified period of time. In this case, the accumulator is responsive to a reset signal to reset the value therein after expiry of the specified period of time. It is also preferred that the filter is a digital filter applying A-weighted free-field corrections to the signals and that the signal processing circuitry includes a squaring function squaring the output of the digital filter. Furthermore, it is preferred that the signal processing circuitry also includes multiplier means to scale the signals received by the digital filter in accordance with a volume setting.

The value held by the accumulator can be converted into units of decibels, and forwarded to a display for visual presentation, and/or to a private branch exchange or computer for logging.

According to another aspect of the present invention there is provided in a telephone device including a digital to analog converter receiving an input PCM data stream, an amplifier amplifying the analog output of said digital to analog converter, a headset speaker broadcasting the amplified analog output, a microphone receiving audio input, and an analog to digital converter receiving the microphone output and generating an output PCM data stream, a noise dosimeter comprising:

a first multiplier receiving said input PCM data stream and a volume setting value;

a second multiplier receiving said output PCM data stream and a sidetone volume setting value, said first and second multipliers scaling said PCM data streams by said volume setting values;

a summing circuit to sum the outputs of said first and second multipliers;

a digital filter receiving the output of said summing circuit and having a transfer function generally modeling the frequency response of said digital to analog converter, amplifier and speaker to provide output approximating noise appearing at said speaker;

signal processing circuitry to process the output of said digital filter; and an accumulator to accumulate the output of the signal processing circuitry, the value in said accumulator representing a user's exposure to noise when using said telephone device.

According to a further aspect of the present invention there is provided a method for measuring a user's exposure to noise when using an appliance having a speaker broadcasting signals comprising the step of:

monitoring the signals to be broadcast by said speaker;

filtering the monitored signals to generate output approximating noise appearing at said speaker;

processing and accumulating the output to generate a value representing a user's exposure to noise appearing at said speaker over a specified period of time.

The present invention provides advantages in that a user's exposure to noise when using the appliance is monitored allowing excess noise exposure to be determined quickly so that steps can be taken to inhibit user hearing loss.

BRIEF DESCRIPTION OF THE DRAWINGS

An embodiment of the present invention will now be described more fully with reference to accompanying drawings in which:

FIG. 1 is a schematic diagram of a telephone device including a noise dosimeter for measuring a user's exposure to noise appearing at the telephone device headset speaker; and FIG. 2 is a schematic diagram of the noise dosimeter of FIG. 1.

DETAILED DESCRIPTION OF THE PREFERRED EMBODIMENT

The present invention relates generally to a noise dosimeter for incorporation into an appliance to measure its noise emissions. More specifically, the present invention relates to a noise dosimeter for use in an appliance with earphones or a headset to measure a user's exposure to noise when using the appliance. During use, the measured noise exposure can be displayed on the appliance and/or logged to maintain a record of the user's exposure to noise. A specific embodiment of the present invention embodied in a telephone device will now be described.

Turning now to FIG. 1, a telephone device is shown and is generally indicated to by reference numeral 10. As can be seen, telephone device 10 includes a digital line receiver 12 coupled between a communication network (not shown) and a digital to analog converter 14. The digital line receiver 12 also provides digital output to a noise dosimeter 16. The digital to analog converter 14 is responsive to a volume control 19 and conveys its analog output to a summing circuit 18, which in turn provides output to a speaker driver 20. The speaker driver 20 amplifies the analog signals before they are broadcast by the headset speaker 22 and received by a user's ear 24. The headset microphone 26 is coupled to the communication network via a microphone receiver 28, an analog to digital converter 29 and a digital line transmitter 30. Microphone receiver 28 also provides input to a sidetone volume control 32, which in turn provides output to the summing circuit 18.

Turning now to FIG. 2, the noise dosimeter 16 is better illustrated. As can be seen, the noise dosimeter 16 includes a multiplier 34 that scales the digital line receiver 12 output PCM data stream by the volume setting of the volume control 19. Noise dosimeter 16 also includes a multiplier 36 that scales the PCM data stream conveyed to the digital line transmitter 30, by the volume setting of the sidetone volume control 32. The outputs of multipliers 34 and 36 are conveyed to a summing circuit 38. A digital filter 40 receives the sum output of the summing circuit 38. Signal processing circuitry 42 receives the output of the digital filter 40. An accumulator 44 receives the output of the signal processing circuitry 42 and reset input from a clock, a private branch exchange (PBX), a computer, etc. Sample period and unit conversion circuitry 46 receives the output of the accumulator 44 and provides output representing a user's exposure to noise over a specified period of time when using the telephone device 10. The output can be used to drive a display on the telephone device, and/or can be sent to a PBX and/or to a computer so that the noise dose can be logged.

The digital filter 40 is designed to have a transfer function that reproduces the frequency response f(pcm) of the incoming signal side of the telephone device 10 referenced to free-field and provides appropriate frequency weighting. In the present embodiment, the digital filter provides A-weighting. The transfer function is determined by measuring the frequency response of a sample telephone device during the manufacturing process using an artificial head or by real-ear measurements. As a result, the A-weighted free-field corrections applied to the PCM data stream by the digital filter 40, result in output which very closely approximates A-weighted free-field noise that reaches the user's ear 24.

The signal processing circuitry 42 includes a non-linear processor 52, if necessary, and a squaring function 54. The output of the digital filter is squared by the squaring function 54 before being conveyed to the accumulator 44. The accumulator 44 accumulates the output received from the squaring function 54 and provides the accumulated value to the circuitry 46. Reset signals from the clock, PBX, computer etc. reset the accumulator value to zero at selected intervals.

The circuitry 46 includes a divider 60 receiving the accumulated value as well as sampling frequency input determining the specified period over which noise measurements are to be taken. For example, if the noise is to be measured over an eight hour period, the sampling frequency input is set to (8 hr. *60 min *60 sec)* (PCM data stream bit rate). The output of the divider 60 is applied to a logarithmic converter 62, which in turn provides output to a multiplier 64. The multiplier 64 also receives factor ten input to provide output representing the user's exposure to noise in units of decibels. As mentioned previously, the output of multiplier 64 is conveyed to a display, a PBX, and/or a computer. In this example, since the noise is to be measured over an eight hour period, the accumulator 44 receives a reset signal every eight hours.

During operation, as the receive and transmit PCM data streams are received by the noise dosimeter 16, they are scaled by the volume settings of volume control 19 and sidetone volume control 32 and then summed. The sum is then filtered by the digital filter 40 so that the output of the digital filter closely approximates the noise appearing at the speaker 22 of the telephone device headset. The digital filter output is then linearized by the non-linear processor 52, if necessary, before being squared by squaring function 54. The output of the squaring function is accumulated by accumulator 44. As a result, the value held by the accumulator is equivalent to:

$$\int p^2(t)d(t) \tag{1}$$

The noise Leq appearing at the headset speaker 22 over a specified period of time, in this case eight (8) hours, is calculated by dividing the accumulator value by the sampling frequency input and converting the divider output into units of decibels using logarithmic converter 62 and multiplier 64.

As will be appreciated, since the telephone device has a noise dosimeter 16 including multipliers 34 and 36 which scale the receive and transmit PCM data streams in accordance with volume settings and a digital filter 40 with a transfer function reproducing the frequency response of the telephone device, accurate data representing a user's exposure to noise when using the telephone device can be accumulated and monitored on an on-going basis.

Although the noise dosimeter is described as being incorporated into a telephone device, those of skill in the art will appreciate that the noise dosimeter may be incorporated into virtually any appliance employing a headset or earphones such as for example portable cassette and CD players Those of skill in the art will also appreciate that although a preferred embodiment of the present invention has been described, variations and modifications may be made without departing from the spirit and scope thereof as defined by the appended claims.

I claim:

1. A noise dosimeter for an appliance including a speaker to broadcast signals comprising:
    a filter receiving signals to be broadcast by said speaker and having a transfer function generally modeling the frequency response of said appliance to provide output approximating noise appearing at said speaker;
    signal processing circuitry to process the output of said filter; and
    an accumulator to accumulate the output of the signal processing circuitry, the value in said accumulator representing a user's exposure to noise when using said appliance.

2. A noise dosimeter as defined in claim 1 further including sampling period circuitry scaling the output of said accumulator to provide a value representing a user's exposure to noise over a specified period of time.

3. A noise dosimeter as defined in claim 1 wherein said filter is a digital filter, applying A-weighted free-field corrections to said signals and wherein said signal processing circuitry includes a squaring function squaring the output of said digital filter.

4. A noise dosimeter as defined in claim 3 wherein said signal processing circuitry further includes multiplier means to scale the signals received by said digital filter in accordance with a volume setting.

5. A noise dosimeter as defined in claim 4 wherein said multiplier means includes a first multiplier receiving an input PCM data stream and an appliance volume setting value and a second multiplier receiving an output PCM data stream and an appliance sidetone volume setting value, said first and second multipliers scaling said PCM data streams by said volume setting values, said noise dosimeter further including a summing circuit to sum the outputs of said first and second multipliers and apply the sum to said digital filter.

6. A noise dosimeter as defined in claim 5 wherein said signal processing circuitry further includes a non-linear processor interposed between said digital filter and said squaring function.

7. A noise dosimeter as defined in claim 2 wherein said accumulator is responsive to a reset signal to reset the value therein after said specified period of time has elapsed.

8. A noise dosimeter as defined in claim 7 further including unit conversion circuitry to convert the output of said sampling period circuitry into units of decibels.

9. A noise dosimeter as defined in claim 8 further including a display to display said value.

10. In a telephone device including a digital to analog converter receiving an input PCM data stream, an amplifier amplifying the analog output of said digital to analog converter, a headset speaker broadcasting the amplified analog output, a microphone receiving audio input, and an analog to digital converter receiving the output of said microphone and generating an output PCM data stream, a noise dosimeter comprising:

a first multiplier receiving said input PCM data stream and a volume setting value;

a second multiplier receiving said output PCM data stream and a sidetone volume setting value, said first and second multipliers scaling said PCM data streams by said volume setting values;

a summing circuit to sum the outputs of said first and second multipliers;

a digital filter receiving the output of said summing circuit and having a transfer function generally modeling the frequency response of said digital to analog converter, amplifier and speaker to provide output approximating noise appearing at said speaker;

signal processing circuitry to process the output of said digital filter; and an accumulator to accumulate the output of the signal processing circuitry, the value in said accumulator representing a user's exposure to noise when using said telephone device.

11. A noise dosimeter as defined in claim 10 further including sampling period circuitry scaling the output of said accumulator to provide a value representing a user's exposure to noise over a specified period of time.

12. A noise dosimeter as defined in claim 11 wherein said accumulator is responsive to a reset signal to reset the value therein after said specified period of time has elapsed.

13. A noise dosimeter as defined in claim 12 further including unit conversion circuitry to convert the output of said sampling period circuitry into units of decibels.

14. A noise dosimeter as defined in claim 13 further including a display to display the noise value for said specified period of time.

15. A method for measuring a user's exposure to noise when using an appliance having a speaker broadcasting signals comprising the step of:

monitoring the signals to be broadcast by said speaker;

filtering the monitored signals to generate output approximating the noise appearing at said speaker;

processing and accumulating the output to generate a value representing a user's exposure to noise appearing at said speaker over a specified period of time.

16. The method of claim 15 wherein during said processing and accumulating step, the value is scaled by a volume setting of said appliance.

17. The method of claim 16 further comprising the step of resetting the value after the specified period of time has expired.

18. The method of claim 16 further comprising the step of displaying the value.

19. The method of claim 16 further comprising the step of maintaining a log of the value for each specified period of time.

* * * * *